May 17, 1955  B. HENSEL  2,708,725
ELECTRODE SYSTEM FOR ELECTRON-BEAM VALVES, IN
PARTICULAR FOR TELEVISION PICTURE TUBES
Filed March 8, 1954
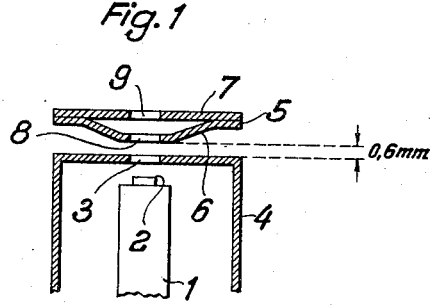
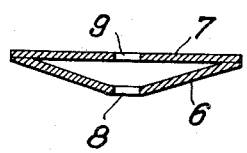
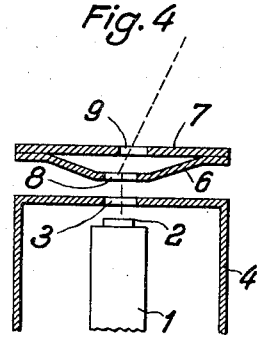
Inventor:

United States Patent Office 2,708,725
Patented May 17, 1955

2,708,725

ELECTRODE SYSTEM FOR ELECTRON-BEAM VALVES, IN PARTICULAR FOR TELEVISION PICTURE TUBES

Bernhard Hensel, Berlin-Friedenau, Germany, assignor to Loewe Opta Aktiengesellschaft, Berlin-Steglitz, Germany, a company of Germany Application March 8, 1954, Serial No. 414,669

Claims priority, application Germany March 9, 1953

2 Claims. (Cl. 313—82)

At the common electrode systems in electron-beam valves, particularly in picture tubes for television, an aperture diaphragm which is kept on a low positive voltage is arranged mostly in a very small distance behind the Wehnelt cylinder. Such diaphragms can consist of an apertured disc at the central aperture of which an elongation tube is fixed thereby representing a tubular passage for the electron-beam.

As at the common electron-beam valves of the type described above the distance between the Wehnelt cylinder and such an aperture diaphragm is kept very small (e. g. smaller than 1 mm.), the dimensions of the aperture diaphragm itself must be likewise very small. Optimally, the length of the central tube for the beam passage must be about 1 mm. The production of such extremely small parts is very difficult. The welding of such smaller tubular parts to the corresponding apertured discs takes much trouble.

The design of an aperture diaphragm with very small dimensions might be tried by simply choosing the thickness of the apertured disc correspondingly, i. e. about 1 mm.; then the passage length of the central aperture would be about 1 mm. just as at a thin apertured disc with a tube welded to it. However, owing to the very small distance (e. g. 0.6 mm.) between the aperture diaphragm and the Wehnelt cylinder, a relatively high capacity between the aperture diaphragm and the Wehnelt cylinder would result at such an arrangement; at the high picture frequencies which have to be recorded this fact would result in an undesirable attenuation of the higher picture frequencies.

According to the present invention the difficulties mentioned above are removed by providing the aperture diaphragm, which is arranged in a small distance from the Wehnelt electrode, with a biconvex or planoconvex transverse section, the convex surface of this aperture diaphragm being directed towards the Wehnelt cylinder. Then, the small distance of about 0.6 mm. between this aperture diaphragm and the Wehnelt cylinder exists only in the central region of the aperture diaphragm whereas the rest of that surface of the aperture diaphragm which is directed towards the Wehnelt cylinder has a greater distance from the latter than the central region. Thus the capacity between the Wehnelt cylinder and the aperture diaphragm is considerably reduced.

The invention can be realized by either designing the biconvex or planoconvex aperture diaphragm as a massive, e. g. lens-shaped, member which is provided with a central aperture for the beam passage, or by assembling the aperture diaphragm by means of two individual apertured discs, the edges of which are united one with another either directly or by inserting a thin distance ring whereas the distance of the central regions of both discs is larger than the distance between their edges. In this case the distance between the two central regions of the apertured discs corresponds to the required passage length of the aperture diaphragm.

The drawing shows some embodiments of the invention as applied to the electrode system of a picture tube of which only those parts are shown in enlargement which are indispensable for understanding the invention. In particular, the following is shown:

Fig. 1 shows the construction of an aperture diaphragm consisting of two individual apertured discs;

Fig. 2 shows an aperture diaphragm one apertured disc of which is conically shaped;

Fig. 3 shows a system with a massive aperture diaphragm;

Fig. 4 shows, in connection with an aperture diaphragm corresponding to the present invention, an application for producing a tilted electron-beam passage for achieving an ion trap effect.

In Fig. 1 the cathode of an electron-beam valve is designated as 1. It is of common design consisting of a cylinder on the frontal face of which an oxide layer 2 is applied as an emission spot. In front of this emission spot and in a very short distance from it the central aperture 3 of a Wehnelt cylinder 4 is arranged.

The Wehnelt cylinder 4 is followed, also in a very short distance (of about 0.6 mm.), by the aperture diaphragm 5. According to the present invention this diaphragm consists of two individual thin metallic circular discs 6 and 7 each of which has a central aperture 8 and 9 respectively for the beam passage. The edges of these two discs 6 and 7 are united one with another, e. g. by welding, whereas their central parts have a distance of about 1 mm. one from another which corresponds to the length of the aperture. In the present example this has been achieved by designing the apertured disc 6 which is the nearest to the Wehnelt cylinder with a convex curvature of its central part. By this means the capacity between the aperture diaphragm 5 and the Wehnelt cylinder 4 is considerably reduced. The production of such aperture diaphragms can be facilitated by designing both discs 6 and 7 with a curvature, thus replacing the planoconvex shape shown in Fig. 1 by a biconvex shape.

According to Fig. 2 the aperture diaphragm is designed so that the disc nearest to the Wehnelt cylinder is not curved but of an exactly conical shape, whereas the other parts shown in Fig. 1 remain unchanged.

According to Fig. 3 the aperture diaphragm does not consist of two individual apertured discs but of one single massive piece of metal with a lens-shaped transverse section the thickness of which in the central part is also about 1 mm. Here, too, the design can be changed by providing the lens according to Fig. 1 with a planoconvex instead of a biconvex transverse section.

Fig. 4 at least shows one embodiment of the invention at which at the same time an ion trap effect is achieved. The aperture diaphragm with the individual apertured discs 6 and 7 which in principle is designed as in Fig. 1 has its passage apertures 8 and 9 respectively arranged unconcentrically; by this means the electron-beam passing the aperture diaphragm is bent away from the valve axis as shown by the dotted line. Correspondingly, the effect shown in Fig. 4 can also be achieved with aperture diaphragms which are designed according to Fig. 2 or Fig. 3.

What I claim is:

1. Electrode system for electron-beam valves for television purposes, containing an aperture diaphragm arranged in front of the Wehnelt cylinder and in a small distance from it, said aperture diaphragm being of conical shape with respect to the Wehnelt cylinder, and consisting of two apertured discs which are united one with another at their edges, the distance between the central parts of the two apertured discs being about 1 mm.

2. Electrode system for electron-beam valves for television purposes, containing an aperture diaphragm arranged in front of the Wehnelt cylinder and in a small distance from it, said aperture diaphragm being of conical shape with respect to the Wehnelt cylinder, and consisting of two apertured discs which are united one with another at their edges, the distance between the central parts of the two apertured discs being about 1 mm., the aperture of that apertured disc which is farther from the cathode being arranged excentrically for achieving an inclined direction of the electron-beam with respect to the valve axis.

References Cited in the file of this patent

UNITED STATES PATENTS

| | | |
|---|---|---|
| 2,111,231 | Von Ardenne | Mar. 15, 1938 |
| 2,268,197 | Pierce | Dec. 30, 1941 |
| 2,644,906 | Bondley | July 7, 1953 |
| 2,672,568 | Cole | Mar. 16, 1954 |